3,377,375
N-ARALKYLSULFONYL CARBAMATES
John A. Stephens, St. Louis, Mo., assignor to Monsanto Company, a corporation of Delaware
No Drawing. Filed Feb. 7, 1963, Ser. No. 256,841
2 Claims. (Cl. 260—470)

This invention relates to N-(aralkylsulfonyl) carbamate esters as novel compositions of matter. This invention further relates to compositions and methods for controlling and protecting plant life by the application of certain N-(aralkylsulfonyl) carbamate esters.

In recent years, the use of chemicals for controlling various biological forms has found widespread acceptance among many people. This is especially true among agriculturalists interested in controlling plant systems and insect pests. For example, chemical compositions have previously been applied to the soil or to the foilage of fully developed plants, thereby destroying certain types of plants in a selective manner and allowing others to continue their growth in a more favorable environment. This type of control, enabling certain plants to grow freely unhampered by competing noxious plants, has also been achieved by the application of chemical compositions to the soil, which chemical compositions either prevent germination of undesirable seeds or destroy the emerging seedlings immediately after germination. Other dangers confronting plant growth and crop yields occur in the form of insect pests and plant diseases. These threats to desirable plant life have been lessened by the application of insecticides and fungicides to the soil, foilage of the plants, and surrounding atmosphere.

Very effective control and protection of desirable plant life is therefore possible through the use of chemicals formulated to provide protection as selective herbicides, insecticides, and plant fungicides. However, all requirements for effectiveness and selectivity among pesticides have not been satisfied. There are still many demands to satisfy among agriculturalists and others—either for more effective pesticides with a selectivity comparable to an old pesticide, or for pesticides with a different selectivity.

It is an object of this invention to provide N-(aralkylsulfonyl) carbamate esters as novel compositions of matter.

It is a further object of this invention to provide novel herbicidal compositions, selectively active in pre-emergence application or foliar contact.

It is a further object of this invention to provide methods for the suppression and control of undesirable plant life.

It is a further object of this invention to provide novel biologically toxic compositions, selectively active as herbicides, insecticides, and fungicides.

It is a further object of this invention to provide novel methods for the control and protection of desirable plant life. Additional objects, benefits, and advantages will become apparent as the detailed description of the invention proceeds.

The compounds useful in the practice of the present invention are those having the molecular configuration:

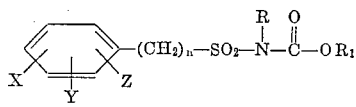

where X, Y and Z are selected from the group consisting of hydrogen, chloro, bromo, iodo, nitro, and lower alkyl radicals; where R is selected from the group consisting of hydrogen, alkyl, cycloalkyl, alkenyl, alkynyl, aryl, alkaryl, aralkyl, and acyl radicals; where $R_1$ is selected from the group consisting of alkyl, cycloalkyl, alkenyl, alkynyl, aryl, alkaryl, aralkyl, and acyl radicals; and where $n$ is an integer from 1 to 4.

Compounds of this invention are useful as biological toxicants. The most distinctive utility of the novel compounds is based upon their ability to inhibit the growth of objectionable plant life. This inhibition or herbicidal activity may be demonstrated by contacting a plant structure with the subject compounds, which may take place either pre-emergently or on established plants. Pre-emergence application may be accomplished in either of two ways—by application of the compounds to the surface of the soil or by incorporation of the compounds into the surface layer of soil.

In addition to herbicidal activity, some of the compounds of this invention possess activity of an insecticidal nature; still others are active as fungicides. Some of the compounds possess multiple activity in two or more of the above mentioned areas. Hence the user may benefit from the application of these compounds in a dual or multiple manner, depending upon which compound or mixture of compounds is selected.

The N-(aralkylsulfonyl) carbamates useful in the practice of this invention may contain an unsubstituted benzyl group attached to the sulfonyl group, as for example, ethyl N-(α-toluenesulfonyl) carbamate. The present invention also encompasses compounds containing substituents on the aromatic ring in either the ortho, meta, or para position. Furthermore, combinations of ortho and meta, ortho and para, meta and para, and ortho, meta and para substitutions are within the scope of this invention, as well as di-ortho and di-meta combinations. These substitutions on the ring may consist of halogen atoms, particularly chlorine, of nitro radicals, and of lower alkyl radicals such as methyl, ethyl, n-propyl, isopropyl, n-butyl, isobutyl, sec-butyl, tert-butyl, n-amyl, isomeric amyl, n-hexyl, and isomeric hexyl radicals. In addition, mixed substitutions on the aromatic ring such as 3-nitro-4-chloro and 2-methyl-4-chloro provide compounds within the scope of this invention. Common and easily prepared substitutions on the aromatic ring comprise 2,4; 2,6; and 2,4,6 combinations. Compounds illustrative of these many possible substitutions include: ethyl N-(p-methyl-α-toluenesulfonyl) carbamate; ethyl N-(o-methyl-α-toluenesulfonyl carbamate; ethyl N-(2,6-dichloro-α-toluenesulfonyl) carbamate; ethyl N-(2-chloro-4-methyl-α-toluenesulfonyl) carbamate; ethyl N-(m-nitro-α-toluensulfonyl) carbamate; ethyl N-(3,4-dichloro-α-toluenesulfonyl) carbamate; ethyl N-(2,4,6-trichloro-α-toluenesulfonyl) carbamate; and ethyl N-(p-isopropyl-α-toluenesulfonyl) carbamate.

The substituent on the nitrogen atom, R in the generic formula, can be either hydrogen or an alkyl, cycloalkyl, alkenyl, alkynyl, aryl, alkaryl, aralkyl, or an acyl radical, preferably containing not more than eight carbon atoms and more preferably not more than four carbon atoms. These radicals may be either straight- or branch-chained. Examples of suitable compounds include: ethyl N-(α-toluenesulfonyl) N-methyl carbamate; ethyl N-(α-toluenesulfonyl)N-benzyl carbamate; ethyl N-(α-toluenesulfonyl)N-butyl carbamate; ethyl N-(α-toluenesulfonyl) N-isopropyl carbamate; ethyl N-(α-toluenesulfonyl)N-p-ethylphenyl carbamate; ethyl N-(α-toluenesulfonyl)N-p-isopropylphenyl carbamate; ethyl N-(α-toluenesulfonyl) N-vinyl carbamate; and ethyl N-(α-toluenesulfonyl)N-acetyl carbamate.

The ester group, $R_1$ in the generic formula, is capable of variation similar to the nitrogen substituent R, insofar as it can be an alkyl, cycloalkyl, alkenyl, alkynyl, aryl, alkaryl, aralkyl, or an acyl radical, preferably containing not more than eight carbon atoms. Examples of compounds illustrative of this variation include: methyl N-

(α-toluenesulfonyl) carbamate; isopropyl N-(α-toluenesulfonyl) carbamate; vinyl N-(α-toluenesulfonyl) carbamate; allyl N-(α-toluenesulfonyl) carbamate; 2-chloroallyl N-(α-toluenesulfonyl) carbamate; tert-butyl N-(α-toluenesulfonyl) carbamate; benzyl N-(α-toluenesulfonyl) carbamate; and phenyl N-(α-toluenesulfonyl) carbamate.

The alkylene group, —(CH$_2$)$_n$— in the generic formula, can be varied from a methylene linkage up to a four carbon chain. Examples of such variation include: ethyl N-(β-phenylethanesulfonyl) carbamate and ethyl N-(3-phenyl-n-butanesulfonyl) carbamate. Substitutions on the alkylene chain are also within the scope of this invention. Hence compounds such as ethyl N-(3-phenyl-2-methylpropanesulfonyl) carbamate and ethyl N-(β-phenyl-α-chloroethanesulfonyl) carbamate are also included.

N-(aralkylsulfonyl) carbamates are strongly acidic materials which form stable salts with amines or inorganic bases. These salts are also useful in various aspects of plant control. Examples of such salts include: ethyl N-(α-toluenesulfonyl) carbamate cyclohexylamine and 2-dimethylaminoethyl-p-nitro-α-toluenesulfonyl) carbamate salt of N,N-dimethylaminoethanol. The alkali metal and alkaline earth metal salts of the N-(aralkylsulfonyl) carbamates are also easily prepared by reacting the subject carbamates with the selected basic material such as NaOH, Na$_2$CO$_3$, KOH, and Ca(OH)$_2$. These salts are stable, easy to handle, and in some cases possess a biological toxicity equal to that of the parent carbamate. In other cases, certain types of biological activity may even be enhanced by conversion of the carbamate to the metal or amine salt.

The general method used in the preparation of N-(aralkylsulfonyl) carbamates involves the reaction of the corresponding sulfonamide with a suitable chlorocarbonate in dry acetone in the presence of anhydrous potassium carbonate. The preparation of amine and inorganic salts was accomplished by dissolving the N-(aralkylsulfonyl) carbamate in dry ether and adding a suitable amine or inorganic base also dissolved in ether or other suitable solvent.

In the preparation of the subject carbamates by the method previously mentioned, the reaction proceeded in the following manner:

(1)

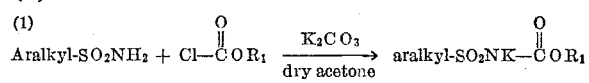

(2)

In the first step, a chlorocarbonate is added to a mixture of a selected aralkylsulfonamide and powdered anhydrous potassium carbonate in dry acetone. Relative quantities of the reactants are not critical, but a good yield of product based upon the percent of aralkylsulfonamide converted to the carbonate can be achieved by using quantities of the chlorocarbonate and potassium carbonate in excess of the stoichiometric amount. Acetone sufficient to dilute the reactants is used. The chlorocarbonate should be added slowly over a period of several minutes with vigorous stirring to prevent re-precipitation of the sulfonamide. After addition, the mixture is heated to reflux temperature and held at this temperature for an hour or more. I have found 5–6 hours to be sufficient for most of my experimentation, but a shorter or longer time may be desirable, depending upon the reactants and the percent yield desired. After cooling, the slurry formed by the reaction is allowed to stand at room temperature for a period of time, overnight if convenient. Upon standing, a white solid is formed which can be collected on a filter and washed with acetone. This solid material is then dissolved in water, and the solution may be filtered to remove undissolved material and extracted with ether. In the second step of the preparation, the solution should be cooled to a temperature which will permit a satisfactory rate of reaction—cooling at 0° C. in an ice bath is suggested—and treated with an excess of concentrated mineral acid to liberate the crude product. The product at this point may be extracted with a suitable water-immiscible solvent such as ethyl ether or benzene. The solvent and extracted product are then dried over a dessicant such as CaSO$_4$ or MgSO$_4$, and the solvent subsequently removed under reduced pressure. If a highly purified product is required, the product may be recrystallized from a suitable solvent.

The advantages and benefits of the present invention will become more fully understood when interpreted in view of the detailed description set forth in the following examples.

Example I

A quantity of 25.7 grams (0.15 mole) of α-toluenesulfonamide was added to a slurry consisting of 20.7 grams (0.15 mole) of anhydrous K$_2$CO$_3$ in 175 ml. of dry acetone. Allyl chloroformate (18.5 grams, 0.15 mole) was added slowly with stirring. This mixture was refluxed for five hours and allowed to stand overnight at room temperature. A white solid which had formed was removed and the acetone filtrate was evaporated leaving an oily residue. The white solid was dissolved in 500 ml. water and cooled in ice. The aqueous solution was filtered to remove any undissolved material and the filtrate acidified to pH 1 or 2 with 19 ml. concentrated HCl to precipitate a white oil. The oil began precipitating around pH 5 and was completely separated around pH 2. This mixture was extracted three times with 50 ml. portions of ether. Upon evaporation of the ether, a hard white solid remained. This solid was identified as allyl N-(α-toluenesulfonyl) carbamate. Weight of the product was 16 grams which represented a 42.7% yield. Sintering point was 71° C.; melting point was 72.5–73.5° C.

Example II

A quantity of 19.5 grams (0.125 mole) of α-toluenesulfonamide was added to a slurry consisting of 18.8 grams (0.136 mole) of anhydrous K$_2$CO$_3$ in 200 ml. of dry acetone. Methyl chlorocarbonate (12.4 grams, 0.131 mole) was added slowly with stirring. This mixture was refluxed for five hours and allowed to stand overnight at room temperature. A white solid which had formed was removed by filtration and dried in air. The white solid was dissolved in 600 ml. water, cooled, and acidified with concentrated HCl to pH 1–2. No precipitate formed. The aqueous solution was then extracted three times with 100 ml. portions of ether. The ether was evaporated from the extract leaving 10 grams of colorless oil. A small amount of this oil was stirred with hexane containing a few drops of absolute ethanol. The oil slowly changed to a white solid. This solid was then used to seed the aqueous solution, thereby causing the product to precipitate as a white oil. The oil was extracted with three 50 ml. portions of ether. Upon evaporation of the ether, a hard white solid remained. This solid was crystallized from an ethanol-hexane mixture and identified as methyl N-(α-toluenesulfonyl) carbamate. Weight of the product was 10 grams which represented a 34.9% yield. Calculated nitrogen content of this compound was 6.11%; found 6.09%. Sintering point was 100° C.; melting point was 104–107° C.

Example III

Ethyl N-(3,4-dichloro-α-toluenesulfonyl) carbamate was prepared by reacting 15 grams (0.0625 mole) of 3,4-dichloro-α-toluenesulfonamide with 7.2 grams of ethyl chlorocarbonate in the presence of anhydrous K$_2$CO$_3$ in acetone according to the procedure described in Example I. The product was crystallized from a 1:1 alcohol-water solution as shiny white flakes. Weight of the final product was 10 grams which represented a 51.1% yield. Calculated analysis of this compound was C 38.50%, H 3.55%, N 4.48%; found C 38.46%, H 3.36%, N 4.42%. Sintering point was 125° C.; melting point was 128–129° C.

Example IV

Ethyl N-(p-nitro-α-toluenesulfonyl) carbamate was prepared by reacting 27.0 grams (0.125 mole) of p-nitro-α-toluenesulfonamide with 14.4 grams (0.131 mole) of ethyl chlorocarbonate in the presence of anhydrous $K_2CO_3$ in acetone according to the procedure described in Example I. The product was crystallized from 95% ethanol as fine white crystals. Weight of the final product was 26.9 grams which represented a 72.4% yield. Calculated analysis of this compound was C 41.66%, H 4.19%, N 9.73%; found C 40.88 and 41.17%, H 4.12 and 4.35%, N 9.59%. Sintering point was 140° C.; melting point was 142–144° C.

Example V

Isobutyl N-(α-toluenesulfonyl) carbamate was prepared by reacting 19.5 grams (0.125 mole) of α-toluenesulfonamide with 18.0 grams (0.131 mole) of isobutyl chlorocarbonate in the presence of anhydrous $K_2CO_3$ in acetone according to the procedure described in Example I. The product was crystallized from 95% ethanol as fine white needles. Weight of the final product was 22.5 grams which represented a 67.4% yield. Calculated analysis of this compound was C 53.11%, H 6.32%, N 5.17%; found C 53.48%, H 6.58%, N 4.96%. Sintering point was 100° C.; melting point was 103–104° C.

Example VI

Isopropyl N - (3,4-dichloro-α-toluenesulfonyl) carbamate was prepared by reacting 19.2 grams (0.08 mole) of 3,4-dichloro-α-toluenesulfonamide with 16.0 grams (0.131 mole) of isopropyl chlorocarbonate in the presence of anhydrous $K_2CO_3$ in acetone according to the procedure described in Example I. Weight of the final product, which was a white solid, was 11.4 grams which represented a 43.8% yield. Sintering point was 147° C.; melting point was 148.5–149.5° C.

Example VII

Isopropyl N-(β-phenylethanesulfonyl) carbamate was prepared by reacting 14.8 grams (0.08 mole) of β-phenylethanesulfonamide with 16.0 grams (0.131 mole) of isopropyl chlorocarbonate in the presence of anhydrous $K_2CO_3$ in acetone according to the procedure described in Example I. Weight of the final product, which was a white solid, was 16.6 grams which represented a 76.5% yield. Sintering point was 48° C.; melting point was 49–51° C.

Example VIII

This example demonstrates how the product yield may be increased by additional purification of the acetone filtrate which has previously been discarded.

Isopropyl N-(p-nitro-α-toluenesulfonyl) carbamate was prepared by reacting 12.0 grams (0.056 mole) of p-nitro-α-toluenesulfonamide with 16.0 grams (0.131 mole) of isopropyl chlorocarbonate in the presence of anhydrous $K_2CO_3$ in acetone according to the procedure described in Example I. The product was crystallized from 95% ethanol as small off-white crystals. Weight of the product was 13.2 grams which represented a 78.0% yield. Sintering point was 162° C.; melting point was 165–166° C.

The acetone filtrate remaining after removal of the potassium carbamate salt was poured into 500 ml. of an aqueous 5% $NaHCO_3$ solution. The solution was cooled and filtered to remove a small amount of undissolved material. The filtrate was salted and extracted with 125 ml. ether. The aqueous layer was then removed and acidified with 16 ml. concentrated HCl. The white solid which precipitated was filtered, washed with water, and dried in air. This solid was additional product. Weight was 2.3 grams, bringing the total yield to 91.6%. Sintering point was 160° C.; melting point was 162–164° C.

Example IX

A quantity of 12.2 grams (0.071 mole) of α-toluenesulfonamide was added to a slurry consisting of 18.8 grams (0.136 mole) of anhydrous $K_2CO_3$ in 200 ml. of dry acetone. Isopropyl chlorocarbonate (16.0 grams, 0.131 mole) was added slowly with stirring. This mixture was refluxed for six hours and allowed to stand overnight at room temperature. A white cake which had formed was removed by filtration, dissolved in water, and acidified. No insoluble oil was formed. This was the first synthesis wherein an acetone-soluble product was formed in this type of reaction. The white cake which had separated from the acetone solution was probably a mixture of $K_2CO_3$, $KHCO_3$, and KCl.

The acetone filtrate was evaporated to dryness, leaving a white crystalline residue. This residue was dissolved in 250 ml. water, which was washed twice with ether. The aqueous solution was acidified with 20 ml. 3 N HCl to a pH 1–2. A white solid separated, which was filtered off, washed with water, and dried in vacuo at 50° C. This solid was identified as isopropyl N-(α-toluenesulfonyl) carbamate. Weight of the product was 14.4 grams which represented a 77.0% yield. Sintering point was 87° C.; melting point was 89–90° C.

Example X

Isopropyl N-(m-methyl-α-toluenesulfonyl) carbamate was prepared by reacting 14.8 grams (0.08 mole) of m-methyl-α-toluenesulfonamide with 16.0 grams (0.131 mole) of isopropyl chlorocarbonate in the presence of anhydrous $K_2CO_3$ in acetone according to the procedure described in Example IX. Weight of the final product which was a white solid, was 18.1 grams which represented a 73.4% yield. Sintering point was 91° C.; melting point was 92–93° C.

Example XI

The cyclohexylamine salt of ethyl N-(α-toluenesulfonyl) carbamate was prepared by reacting 5.0 grams (0.0206 mole) of ethyl N-(α-toluenesulfonyl) carbamate with 2.0 grams (0.020 mole) of cyclohexylamine in 125 ml. ether. The white solid which formed was filtered off, washed with ether, and dried in vacuo at 55° C. Weight of the product was 6.0 grams which represented a yield of 88.4%. Sintering point was 114° C.; melting point was 115–117° C.

Example XII

β-Dimethylaminoethyl N-(p-nitro - α - toluenesulfonyl) carbamate salt of N,N-dimethylaminoethanol was prepared by reacting 10 grams (0.035 mole) of ethyl N-(p-nitro-α-toluenesulfonyl) carbamate with 20 grams (0.225 mole) of N,N-dimethylaminoethanol in the presence of 0.5 gram of aluminum isopropoxide. A white gum was formed and the entire mixture was heated to 125° C. for 2.5 hours to distill off excess alcohols. Upon cooling to room temperature and standing overnight, a dark red glassy solid formed. Upon heating with absolute alcohol, a brown powder was formed. This powder was filtered off and dried at 55° C. Weight of the powdered product was 5.9 grams which represented a yield of 39.5%. The product was insoluble in ether and hexane, slightly soluble in alcohol, acetone, and water, and soluble in hot aqueous alcohol. Sintering point was 175° C.; melting point was 184–187° C. with decomposition.

Example XIII

In this example, the biological activity of the N-(aralkylsulfonyl) carbamates is demonstrated. Table 1 presents data showing the herbicidal activity of some of the subject carbamates upon selected plant systems at various rates of application in a pre-emergence application to the soil wherein seeds of these plants are present. The roman numerals represent selected N-(aralkylsulfonyl) carbamates where:

I=Allyl N-(α-toluenesulfonyl) carbamate;
II=Methyl N-(α-toluenesulfonyl) carbamate;
III=Ethyl N-(α-toluenesulfonyl) carbamate;
IV=Isopropyl N-(α-toluenesulfonyl) carbamate;
V=Ethyl N-(3,4-dichloro-α-toluenesulfonyl) carbamate;
VI=Isopropyl N-(3,4-dichloro-α-toluenesulfonyl) carbamate; and
VII=Isopropyl N-(m-methyl-α-toluenesulfonyl) carbamate.

The plants on which the above carbamates were tested are designated in Table I as follows:

A=Grass
B=Broadleaf
C=Morning glory
D=Wild oats
E=Brome grass
F=Rye grass
G=Radish
H=Sugar beet
I=Foxtail
J=Crab grass
K=Pigweed
L=Soybean
M=Wild buckwheat
N=Tomato
O=Sorghum The testing procedure used in the evaluation of pre-emergence activity is as follows. A good grade of topsoil was placed in either 9½" x 5¾" x 2¾" or 9" x 13" x 2" aluminum pans and compacted to a depth of ⅜ inch from the top of the pan. On top of the soil were placed a designated number of seeds of radish, morning glory, tomato, sugar beet, sorghum, brome grass, wild buckwheat, giant foxtail, rye grass, wild oat, pigweed, crab grass, and soybean. Two different chemical applications were made; one wherein the herbicidal composition was applied to the surface of the soil and the other wherein the composition was admixed with or incorporated in the top layer of soil. For the surface application, the seeds were then covered with ⅜ inch of prepared soil mixture and the pan leveled. In the soil-incorporation plantings, a weighed amount of prepared soil mixture was blended with the herbicide composition in a separate mixing container, and this blend was then used to cover the seeds. The surface application of the herbicide composition was made by spraying the surface of the soil with a solvent solution containing a sufficient quantity of the subject carbamate to obtain the desired rate per acre on the soil surface. The watering of the seeds in both type plantings was accomplished by placing the aluminum pans in a sand bench bringing the water level to ½ inch depth thereon and permitting the soil in the pans to absorb moisture through the perforated bottoms of the pans and the excess water to drain through an opening in the bottom of the bench.

The planted pans were maintained there for 14 days under ordinary conditions of sunlight and watering. At the end of this time the plants were observed and the results recorded by counting the number of plants of each species which germinated and grew. The herbicidal rating was obtained by means of a fixed scale based on the average percent germination of each seed lot. Herbicidal activity is indicated according to the following scale:

0=No phytotoxicity
1=Slight phytotoxicity
2=Moderate phytotoxicity
3=Severe phytotoxicity

Example XIV

In this example, the contact herbicidal activity of the same N-(aralkylsulfonyl) carbamates was determined in greenhouse tests. The carbamate to be tested was applied in spray form to 21-day old specimens of the same grasses and broadleaf plants as used in the pre-emergent tests described in Example XIII. The same number of seeds of the same plants used in Example XIII were planted in aluminum pans in the same manner. After the plants were 21 days old, they were sprayed with six ml. of a 0.5% solution of the subject carbamate which corresponds to a rate of approximately 10 lbs. per acre. Secondary testing was performed using 0.2% and 0.05% solutions of the carbamates which correspond to a rate of approximately four lbs. per acre and one lb. per acre, respectively.

Data obtained from tests conducted in this manner are given in Table II. In some of the evaluations, when the only selectivity shown was between monocotyledon and dicotyledon plants, i.e. when all grasses reacted similarly and all broadleaf plants reacted similarly, then all the plants were classified as either grass or broadleaf, and the herbicidal activity of the carbamates was noted accordingly. However, the testing procedure was conducted on the same types of seeds. Herbicidal activity is indicated according to the following scale:

0=No phytotoxicity
1=Slight phytotoxicity
2=Moderate phytotoxicity
3=Severe phytotoxicity
4=Plant dead

TABLE II

| | A | B | C | D | E | F | G | H | I | J | K | L | M | N | O |
|---|---|---|---|---|---|---|---|---|---|---|---|---|---|---|---|
| I: 0.5% | 0 | 2 | | | | | | | | | | | | | |
| II: 0.5% | 1 | 2 | 0 | 1 | 1 | 0 | 1 | 2 | 1 | 1 | 1 | 3 | 3 | 3 | 1 |
| 0.2% | 0 | 1 | | | | | | | | | | | | | |
| 0.05% | 0 | 0 | | | | | | | | | | | | | |
| III: 0.5% | 2 | 3 | | | | | | | | | | | | | |
| 0.2% | 0 | 2 | | | | | | | | | | | | | |
| IV: 0.5% | 4 | 3 | 0 | 4 | 4 | 4 | 3 | 3 | 3 | 3 | 4 | 3 | 4 | 4 | 4 |
| 0.2% | 3 | 2 | 2 | 1 | 1 | 2 | 3 | 1 | 4 | 4 | 4 | 2 | | | 4 |
| 0.05% | 0 | 0 | 0 | 0 | 0 | 0 | 0 | 0 | 0 | 0 | 0 | 0 | 0 | 0 | 0 |
| V: 0.5% | 1 | 3 | 3 | 0 | 1 | 1 | 3 | 2 | 1 | 1 | 1 | | 3 | 1 | 1 |
| 0.2% | 0 | 2 | | | | | | | | | | | | | |
| VI: 0.5% | 2 | 2 | 4 | 0 | 0 | 0 | 3 | 1 | 1 | 2 | 3 | 2 | 3 | 2 | 1 |
| 0.2% | 0 | 2 | 1 | 0 | 0 | 0 | 2 | 1 | 0 | 0 | 4 | 1 | 2 | 4 | 0 |
| VII: 0.5% | 0 | 1 | | | | | | | | | | | | | |

Use of the data given in Tables I and II will enable those skilled in the art to select the proper compound, dosage, and manner of application to accomplish their purposes with a minimum of damage to desirable plants and seeds.

Example XV

In this example, other biological toxicant activity of the N-(aralkylsulfonyl) carbamates is demonstrated. As mentioned previously, the chief utility of these compounds lies in their ability to control undesirable plant growth in a selective manner, both by pre-emergent application to the soil and by foliar contact. In addition to this activity, certain N-(aralkylsulfonyl) carbamates exhibit some activity as insecticides and fungicides. For instance, ethyl N-(3,4-dichloro-α-toluenesulfonyl) carbamate; the cyclo-

TABLE I

| | A | B | C | D | E | F | G | H | I | J | K | L | M | N | O |
|---|---|---|---|---|---|---|---|---|---|---|---|---|---|---|---|
| I: 5 lbs./a | 0 | 0 | 0 | 0 | 0 | 0 | 0 | 0 | 0 | 0 | 0 | 0 | 0 | 0 | 0 |
| II: 5 lbs./a | 0 | 0 | 0 | 0 | 0 | 1 | 2 | 0 | 2 | 0 | 3 | 0 | 0 | 0 | 0 |
| III: 5 lbs./a* | 1 | 2 | 1 | 0 | 0 | 2 | 0 | 3 | 1 | 3 | 3 | 1 | 3 | 3 | 0 |
| 1 lbs./a | 2 | 2 | 2 | 0 | 3 | 3 | 0 | 2 | 2 | 3 | 3 | 2 | 2 | 0 | 1 |
| IV: 25 lbs./a | 3 | 3 | 3 | 2 | 1 | 3 | 3 | 3 | 3 | 3 | | 0 | 3 | 1 | |
| 5 lbs./a* | 0 | 0 | 0 | 0 | 0 | 0 | 0 | 0 | 0 | 0 | 0 | 0 | 0 | 0 | |
| V: 5 lbs./a | 0 | 2 | 2 | 0 | 0 | 0 | 3 | 0 | 0 | 0 | 3 | 3 | 0 | 0 | 0 |
| 2 lbs./a* | 0 | 1 | 1 | 0 | 0 | 0 | 1 | 1 | 0 | 0 | 2 | 1 | 0 | 0 | 0 |
| 1 lb./a* | 0 | 1 | 0 | 0 | 0 | 0 | 0 | 1 | 3 | 0 | 0 | 2 | 0 | 0 | 0 |
| VI: 5 lbs./a | 0 | 0 | 0 | 0 | 0 | 0 | 0 | 0 | 0 | 0 | 0 | 0 | 0 | 0 | 0 |
| VII: 5 lbs./a | 0 | 1 | 0 | 0 | 0 | 0 | 2 | 2 | 0 | 0 | 2 | 3 | 0 | 0 | 0 |

*Incorporation into top soil; treatments not marked with an asterisk are surface applications.

hexylamine salt of ethyl N-(α-toluenesulfonyl) carbamate; and isopropyl N-(p-nitro-α-toluenesulfonyl) carbamate are active as insecticides at 1.0% concentration against bean beetle larvae.

The compounds of this invention were also tested on various organisms to determine their fungicidal activity. Testing of fungicidal activity on the organisms *Rhizoctonia solani* and *Phythium ultimum* was carried out in the following manner: a uniform supply of soil was infested with the appropriate organism. In this soil, 15 cotton and 15 cucumber seeds were planted. Activity of the carbamates was measured by reference to the emergence and condition of plants grown from these seeds. Activity on the other fungi was determined by spraying plants infested with the appropriate disease with a solution of the concentration designated below in Table III. The roman numerals represent selected N-(aralkylsulfonyl) carbamates where:

I=Allyl N-(α-toluenesulfonyl) carbamate;
II=Methyl N-(α-toluenesulfonyl) carbamate;
III=Ethyl N-(α-toluenesulfonyl) carbamate;
IV=Isopropyl N-(α-toluenesulfonyl) carbamate;
V=Ethyl N-(3,4-dichloro-α-toluenesulfonyl carbamate;
VI=Isopropyl N-(3,4-dichloro-α-toluenesulfonyl) carbamate;
VII=Isopropyl N-(m-methyl-α-toluenesulfonyl) carbamate;
VIII—Isopropyl N-(p-nitro - α - toluenesulfonyl) carbamate;
IX=Isopropyl N-(β-phenylethanesulfonyl) carbamate;
X=Isobutyl N-(α-toluenesulfonyl) carbamate; and
XI=Ethyl N-(p-nitro-α-toluenesulfonyl) carbamate.

Fungicidal activity is indicated thus:

A(  )=Active at designated and higher concentrations;
N(  )=Not active at designated and lower concentrations.

Concentrations within the parentheses are expressed in percent weight. The blank spaces indicate no testing.

than 50% of the entire formulation, of an adjuvant or adjuvants.

Liquid extending agents are also useful in the practice of this invention. The N-(aralkylsulfonyl) carbamates of this invention are insoluble in water and are readily soluble in most organic solvents. Therefore the choice of a liquid extending agent is quite variable if a solution of the active ingredients is desired. In addition the active compounds need not be dissolved but merely dispersed in the extending agent in the form of a suspension or emulsion. One method of forming this dispersion is to dissolve the N-(aralkylsulfonyl) carbamate in a suitable organic solvent and then add this solution to water or some other liquid extending agent to form the dispersion. Examples of some organic solvents suitable for use as extending agents when a solution is desired include: ethers such as ethyl ether, isoproply-ether, n-proply ether; alcohols such as ethyl, isopropyl, n-propyl, and butyl alcohols; ketones such as acetone, methylethyl ketone, and cyclohexanone; and aromatic hydrocarbons such as benzene, toluene, xylene and cumene. Solvents in the above named group which are not suitable for use with selected N-(aralkylsulfonyl) carbamates have been so noted in the example given above. Solvents useful as extending agents when a dispersion of the active compound in the solvent is acceptable include: water, hexane, and other aliphatic hydrocarbons.

The incorporation of the surface active agent into the herbicidal formulation is an aid helpful in forming uniform dispersions or emulsions of the active N-aralkylsulfonyl carbamates in water. This surface active agent, that is the wetting, emulsifying, or dispersion agent, may be either anionic, cationic, non-ionic, or mixtures thereof. Suitable wetting agents are the organic compounds capable of lowering the surface tension of water and include the conventional soaps such as the water-soluble salts of long-chain carboxylic acids; the amino soaps such as the amine salts of long-chain carboxylic acids; the sulfonated

TABLE III

| Organism | I | II | III | IV | V | VI | VII | VIII | IX | X | XI |
|---|---|---|---|---|---|---|---|---|---|---|---|
| Rhyizoctonia | N (.01) | N (.01) | A (.01) | N (.01) | A (.003) | A (.01) | A (.01) | N (.01) | N (.01) | A (.003) | N (.01). |
| Phythium | A (.003) | A (.003) | A (.01) | A (.003) | A (.003) | A (.01) | A (.003) | A (.01) | A (.01) | A (.003) | N (.01). |
| Tomato Leaf Spot | N (.03) | | | | A (.01) | N (.01) | N (.01) | N (0.1) | | | A (.01). |
| Wheat Rust | A (0.1) | N (0.3) | N (0.1) | A (0.1) | A (0.3) | A (0.3) | N (0.3) | N (0.3) | N (0.1) | N (0.1) | A (.01). |
| Tomato Blight | A (.01) | N (0.1) | | | A (.01) | N (0.1) | N (0.1) | N (0.1) | A (0.1) | N (0.1) | N (0.1) | A (0.3). |
| Apple Scab | N (.01) | | | | | N (0.1) | N (0.1) | | | N (0.1) | A (0.1). |

The biologically active compounds of this invention are either solid or liquid materials, depending upon the particular substituents present in the compounds. To aid in achieving a uniform distribution of the active compounds over the entire area of the soil or plants to be treated, it is often advantageous to employ a composition comprising a diluent or extending agent in addition to the active compounds. Suitable solid extending agents are those which render the compositions permanently dry and free flowing. Therefore hygroscopic materials are not preferred extending agents unless there is included in the composition a separate substance to aid flowability. Effective solid diluents include natural clays, such as china clays, bentonites, and the attapulgites; other minerals in their natural state such as talc, pyrophylite, quartz, diatomaceous earth, Fuller's earth, chalk, rock phosphate, and sulfur; and chemically modified minerals, such as acid-washed bentonite, precipitated calcium phosphate, precipitated calcium carbonate, and colloidal silica. These diluents may represent a substantial portion, e.g. 50 to 98 percent by weight, of the entire formulation as applied to plant or soil. Formulations more concentrated with respect to the active ingredient may be prepared, but they will usually require additional dilution by the user in order to properly prepare the composition for the most effective usage. Therefore the toxicant formulation as applied in the field will normally consist of a minor amount, i.e. less than 50% by weight of the entire formulation, of the N-(aralkylsulfonyl) carbamates and a major amount, or more than 50% of the entire formulation, of an adjuvant or adjuvants.

animal, vegetable, and mineral oils; quaternary salts of high molecular weight acids; rosin soaps such as salts of abietic acid; sulfuric acid salts of high molecular weight organic compounds; algin soaps; and simple and polymeric compositions having both hydrophilic and hydrophobic functions.

The concentrated compositions of this invention ordinarily have the active ingredient and the surface active agent present in higher concentrations than the toxicant compositions applied in the field so that upon dilution with an extending agent, compositions containing optimum proportions of active ingredient and surface active agent are prepared to obtain uniform distribution and to maintain the active ingredient in a form enabling prompt assimilation by the plants.

The concentrate compositions of this invention preferably comprise 5% to 95% by weight of the active ingredient, the remainder consisting of the adjuvant. If a liquid concentrate is desired, this adjuvant may be solely liquid extending agent or surface active agent, but preferably is a combination of the two. Preferably the surface active agent comprises from 0.1% to 15% of the concentrate, and the liquid extender comprises from 5% to 95% of the concentrate. If a solid concentrate is desired, the adjuvant is usually made up solely of a solid extender unless the dust concentrate is to be applied as a wettable powder, in which case an amount of surface active agent comparable to that used in the liquid formulation, that is 0.1% to 15%, may be desirable.

Carrier materials or diluents necessary to dilute the concentrates to a toxilogical level suitable for plant control may be either a liquid or particulate solid. Materials mentioned previously as extenders may also be used as carriers; however the use of some of these materials as carriers is often not economically feasible. Water is a preferred liquid carrier; suitable solid carriers include solid fertilizers such as ammonium nitrate, urea, and superphosphate, as well as other materials in which plant organisms may take root and grow such as compost, manure, humus, and sand.

In addition to the above described conditioning agents, other adjuvants may be added, such as insecticides, fungicides, nematocides and other herbicides of a supplementary nature. This may be done when it is desired to broaden the spectrum of activity to include other problem weeds, insects, or fungi.

The herbicidal compositions of this invention are applied to the plant systems in the conventional manner. Thus, the dust and liquid compositions may be applied to the foliage of growing plants or to the soil by the use of power-operated dusters and sprayers as well as manually operated devices. Some of the compounds of this invention provide superior protection and control when mixed with the top few inches of soil. This can be accomplished by addition of the composition to irrigation water supplied to the field to be treated. Dust compositions sprinkled on the surface of the soil can be distributed below the surface by the usual discing, dragging, or mixing operations.

The application of a toxic amount of the N-(aralkylsulfonyl) carbamate to the area to be controlled is essential to the practice of this invention. The exact dosage to be applied is dependent not only upon the specific carbamate but also upon the particular type of protection desired. As a general rule, the herbicidal activity of the N-(aralkylsulfonyl) carbamates is the most significant and the fungicidal and insecticidal activities are usually somewhat less pronounced. Herbicidal activity is usually achieved by application of the N-(aralkylsulfonyl) carbamates at a rate of from 1 to 50 pounds per acre. However lower rates of application may be required with some of the carbamates, particularly if a herbicidally selective activity is desired, and higher rates may be required if it is desirable to include a fungicidally or insecticidally toxic amount of the carbamate in the formulation.

The biologically active compounds of this invention have been described in terms of specific groups or types of N-(aralkylsulfonyl) carbamates. However it should be noted that this invention is intended to cover those compounds in which the substituent groups (the X, Y, Z, R, and $R_1$ radicals) can also contain constituents other than those mentioned if these constituents do not interfere with the biological activity of the parent N-(aralkylsulfonyl) carbamate. Those skilled in the art will recognize that a compound containing a hydrocarbon radical that is substituted with a non-interfering group is the equivalent of the corresponding compound containing a non-substituted hydrocarbon radical. Such a non-interfering group can be initially present in a compound subjected to one of the reactions of this invention and can, depending on circumstances, either be retained in the product molecule or be destroyed or changed during the reaction; or such group can be introduced by known means into one of the new compounds of this invention subsequent to the formation of such compound. Accordingly, these and other modifications are contemplated which can be made without departing from the spirit of the described invention.

What is claimed is:

1. Ethyl N-(3,4-dichloro-α-toluenesulfonyl) carbamate.
2. β-Dimethylaminoethyl N - (p-nitro-α-toluenesulfonyl) carbamate salt of N,N-dimethylaminoethanol.

References Cited

UNITED STATES PATENTS

| | | | |
|---|---|---|---|
| 2,776,197 | 1/1957 | Gyrin et al. | 260—479 |
| 2,933,383 | 4/1960 | Lambrech | 260—479 |
| 2,990,326 | 6/1961 | Aumuller et al. | 260—470 |
| 3,057,910 | 9/1962 | Fischer et al. | 260—479 |
| 3,017,427 | 1/1962 | Hamor | 260—470 |
| 3,067,237 | 12/1962 | Larsen | 260—470 |
| 2,632,698 | 3/1953 | Stewart | 71—2.6 |
| 3,039,863 | 6/1962 | Fancher et al. | 71—2.6 |
| 2,907,692 | 10/1959 | Haack et al. | 260—553 |

FOREIGN PATENTS

| | | |
|---|---|---|
| 851,010 | 10/1960 | Great Britain. |
| 857,148 | 12/1960 | Great Britain. |
| 823,970 | 12/1951 | Germany. |
| 1,119,263 | 12/1961 | Germany. |

LORRAINE A. WEINBERGER, *Primary Examiner.*

JULIAN S. LEVITT, RICHARD K. JACKSON, *Examiners.*

J. O. THOMAS, P. J. KILLOS, *Assistant Examiners.*